Figure 1:
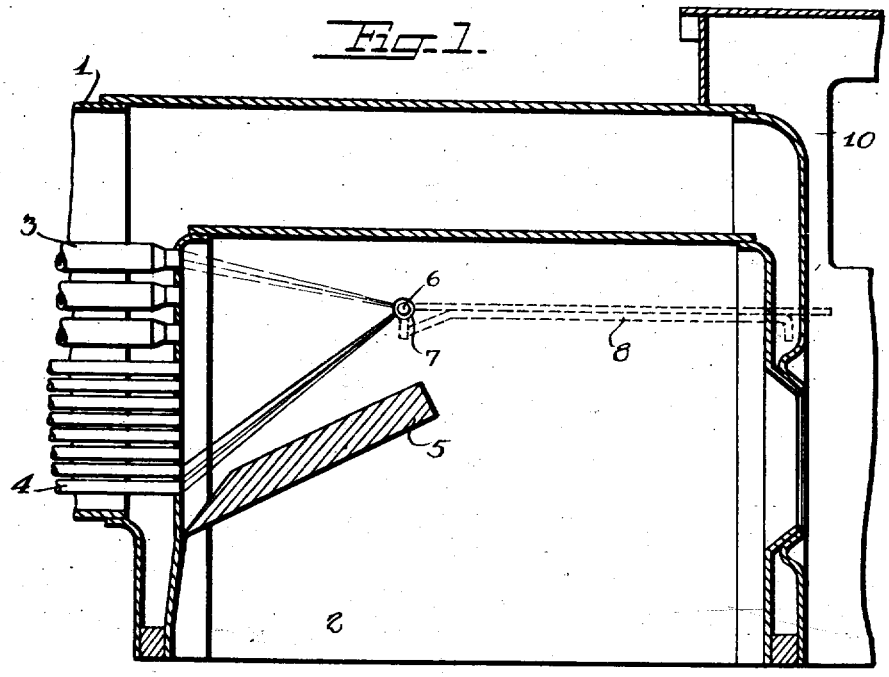

Nov. 16, 1926. Re. 16,471

J. BORE ET AL

STEAM CLEANSING DEVICE FOR LOCOMOTIVE BOILERS OR THE LIKE

Original Filed Jan. 20, 1919 3 Sheets-Sheet 1

INVENTORS.
Johan Bore
Albert Skoglund
by Marcus and Clerk
ATTORNEYS

Nov. 16, 1926. Re. 16,471

J. BORE ET AL

STEAM CLEANSING DEVICE FOR LOCOMOTIVE BOILERS OR THE LIKE

Original Filed Jan. 20, 1919 3 Sheets-Sheet 2

INVENTORS.
Johann Bore
Albert Stoughton
by Marks & Clerk
ATTORNEYS.

Nov. 16, 1926. J. BORE ET AL Re. 16,471

STEAM CLEANSING DEVICE FOR LOCOMOTIVE BOILERS OR THE LIKE

Original Filed Jan. 20, 1919 3 Sheets-Sheet 3

INVENTORS.
Johan Bore
Albert Skoglund
by Marks & Clerk
ATTORNEYS

Reissued Nov. 16, 1926.

Re. 16,471

UNITED STATES PATENT OFFICE.

JOHAN BORE AND ALBERT SKOGLUND, OF GOTTENBORG, SWEDEN, ASSIGNORS TO CARL AXEL ARVID WESTERBERG, OF STOCKHOLM, SWEDEN.

STEAM CLEANSING DEVICE FOR LOCOMOTIVE BOILERS OR THE LIKE.

Original No. 1,463,494, dated July 31, 1923, Serial No. 272,076, filed January 20, 1919, and in Sweden April 15, 1918. Application for reissue filed July 22, 1925. Serial No. 45,429.

In marine boilers and sometimes also in stationary boilers the use of steam cleansing or sweeping devices is well known for the cleansing of the tubes, the said devices primarily consisting of a steam supply pipe with a discharge nozzle the latter being entered into the fire box or into the smoke uptake in such a position that the escaping steam may act upon the tubes, either in the direction of the draft, or contrary to such direction. In locomotive boilers where an inclined bridge is generally disposed in front of part of the set of tubes the employment of such an apparatus is rendered difficult on account of the excessive heat preventing the apparatus from being entered into the furnace so far as to keep the steam jet from being obstructed by the bridge. As it is hardly possible for a person to work in front of the boiler when driving the locomotive, the cleansing or sweeping apparatus cannot be brought into the smoke box from the front end of the locomotive. The above circumstances, therefore, always necessitated the sweeping of locomotives to take place at intervals when the engine was not in active operation, this naturally involving a considerable loss of time, besides which the draft of the locomotive is reduced, particularly when driving over long distances, through the masses of grime which in the meantime gather in the comparatively narrow and long tubes.

The present invention relates to a contrivance by means of which the said difficulties are overcome so that sweeping may take place at any time during the run of the engine.

The invention is principally characterized by this that a steam supply pipe provided with a discharge nozzle is fitted in the furnace in such way as to enable the nozzle to be brought into the furnace in known manner, also during the run of the locomotive, as might be required, and placed in such a position by means of manœuvring devices accessible in the driver's cab, that the escaping steam will hit the tubes and enter the same, the said discharge nozzle may also be adapted to be brought out of the furnace so far that it is withdrawn from direct contact with the furnace gases.

Figure 2:
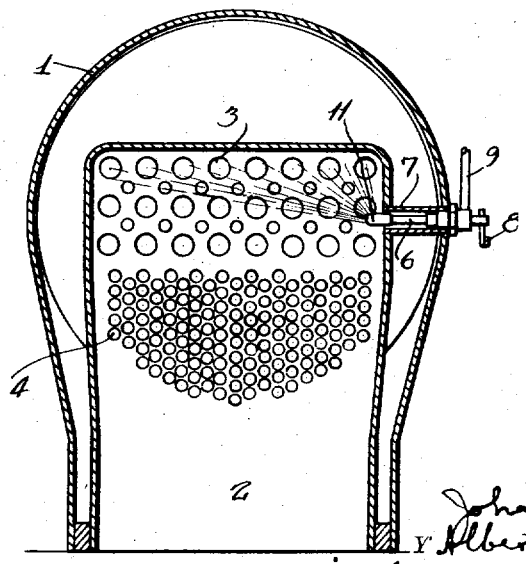
Figure 3:
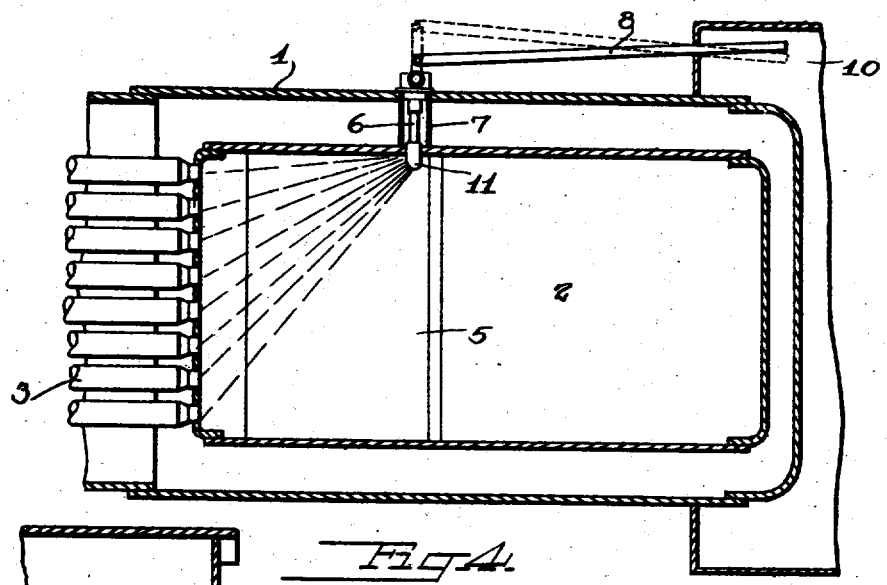
Figure 4:
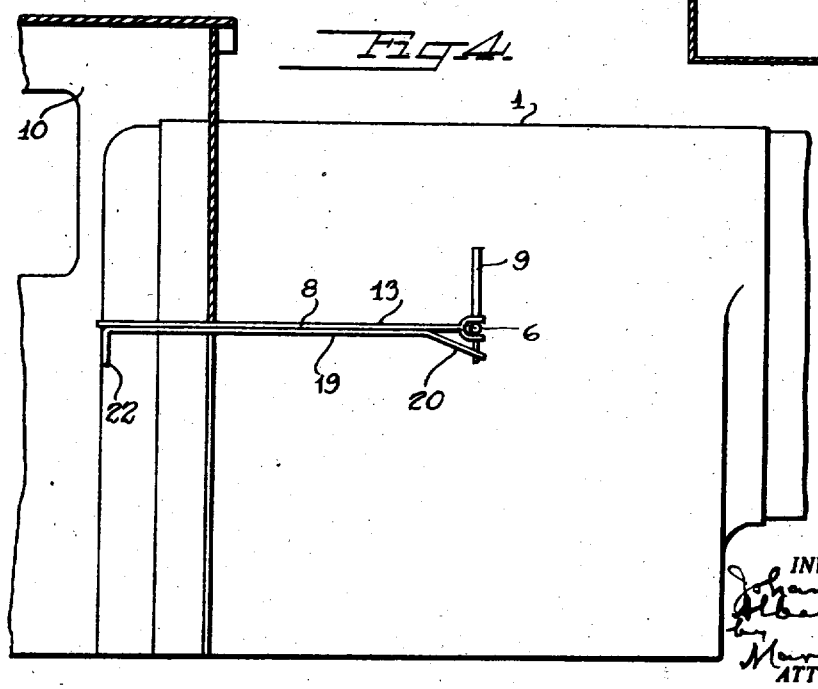
Figure 5:
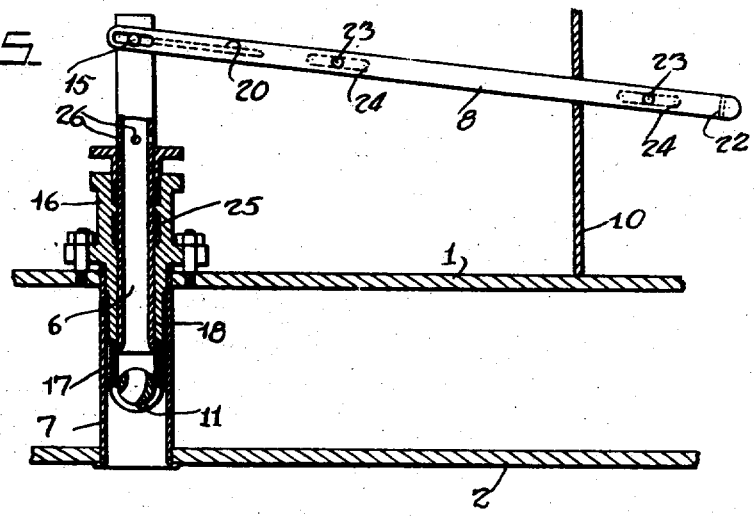
Figure 6:
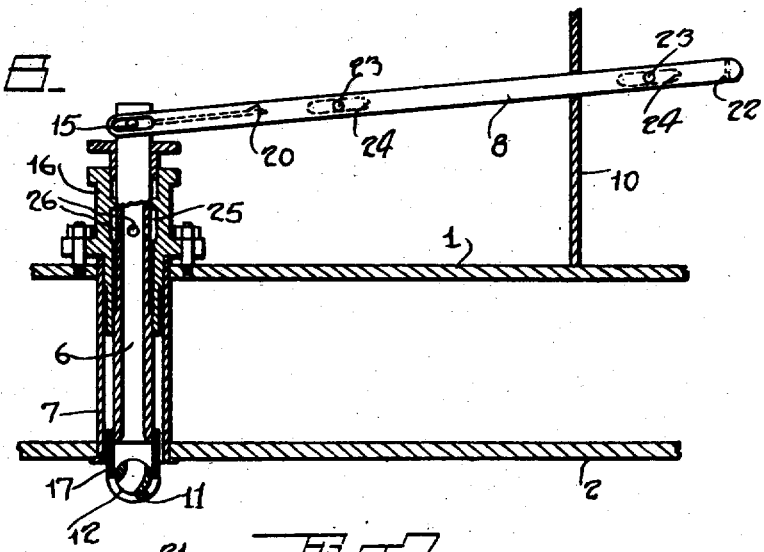
Figure 7:
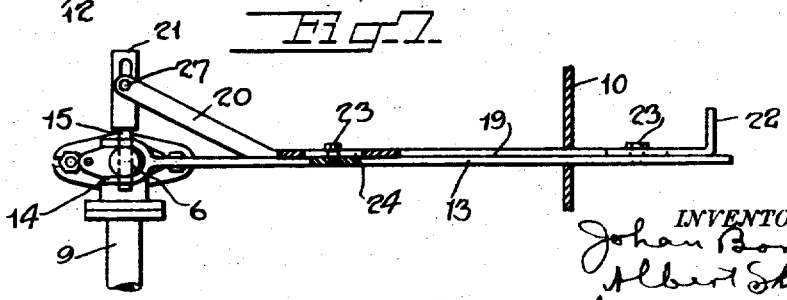

An embodiment of the invention is shown in the accompanying drawings, in which Fig. 1 shows a vertical longitudinal section of part of the locomotive boiler. Fig. 2 is a vertical cross section of the same part, and Figs. 3 and 4 respectively represent a horizontal section and an elevation of the part of the boiler shown in Figs. 1 and 2, Figs. 5 and 6, which are drawn to a larger scale, show two horizontal sections of a smaller part of the same boiler fitted with a steam sweeping device, and Fig. 7 is a plan view of the details according to Fig. 6, some of the parts being shown in section.

1 designates the shell plate of the locomotive boiler, the furnace 2 being arranged within it in known manner. The furnace 2 is connected with the smoke box by means of an upper group of larger tubes 3 and a lower group of smaller tubes 4. An inclined bridge 5 in known manner prevents the fire from entering the tubes 3, 4 directly. At the one side of the furnace 2 a steam discharge or supply pipe 6 is inserted through a nipple or stay tube 7 passing through the water-leg formed adjacent the side of the furnace by the walls 1 and 2, the said nipple 7 being fitted water tight to the plates 1 and 2. The steam supply pipe 6 is rotatably and slidably mounted in a casing 16 secured to the plate 1, the said casing being provided with a chamber 25 supplied with steam from the boiler through a pipe 9. The chamber 25 communicates with the interior of the pipe 6 through apertures or ports 26 in the latter when the pipe 6 occupies the position shown in Fig. 6. At the end adjacent to the furnace the steam supply pipe 6 is fitted with a discharge nozzle 11 provided with a blow-through-channel 12 which in known way is shaped so as to give the escaping steam a flattened out fan-like spreading. The nozzle-pipe 6 and the nipple 7 are horizontally mounted in the water-leg in a position about midway between the front part of the fire bridge 5 and the top of the fire-box and slightly to the rear of the front edge of the fire bridge, as shown in Fig. 1. In this position the axis of the concentric nozzle-pipe and the nipple is included in a plane normal to the longitudinal axes of the tubular flues 3 and 4. When the nozzle-pipe is projected in this plane into the fire-box and is rotated, the fan-like jet of steam emitted from the nozzle sweeps the terminals of the tubular flues. The nozzle pipe 6 is provided with a manœuvring contrivance 8 reaching into the driver's cab 10. The said manœuvring contrivance according to the embodiment shown partly consists of a lever 13 engaging a pin 15 with its forked end, the pin 15 passing through the part of the pipe 6 which is outside of the casing 16. The free end 21 of the pin 15 is provided with a slot, this slot being entered by a stud 27, on an arm 20. The arm 20 is rigid with a rod 19 which is mounted on the rod 13 by means of screws 23 so that the rod 19 and the rod 13 together form a part of the manœuvring contrivance 8. The screws 23 are adapted to pass through slots 24 provided in the rod 19, so that the latter may be moved relatively to the rod 13. The rod 19 is extended through the wall 10 and turned to form a handle 22 on the inside of the said wall 10.

The operation of the apparatus is as follows:

When sweeping is to be done the steam supply pipe 6 is entered into the furnace by means of the rod 13, this rod being adapted to swing in the manner of a lever fulcrumed in the wall of the driver's cab. This being done, the ports 26 of the pipe 6 are brought within the chamber 25 on the casing 16 communicating with the pipe 9 so as to cause the steam to be discharged through the channel 12 of the nozzle 11 against the tubes, as is diagrammatically shown by full lines in Fig. 1. Through the manipulation of the handle 22 the pin 15, 21 and the pipe 6 may be turned from within the driver's cab by sliding the rod 19, 20 to and fro so that the steam jet will sweep over all of the tubes 3 and 4 in turn, or only over part of them, as may be desired. The sweeping having been done, the pipe 6 is drawn in so far within the nipple 7, by swinging of the rod 13, that the edge 17 of a cap enclosing the nozzle 11 will abut against a sleeve 18 projecting from the casing 16 into the nipple 7. By this withdrawal of the pipe 6 with its discharge nozzle 11 these parts are protected against any damage from the fire and the hot gases in the furnace. Through the withdrawal of the nipple 6 within the pipe 7 the ports 26 will be moved out of range of the chamber 25 (see Fig. 5) and the supply of steam is hereby discontinued without a separate shut-off valve having to be manipulated.

By means of the manœuvring contrivance 8 formed by the rods 13 and 19 the whole apparatus may be easily and conveniently operated, and all of the tubes, or only a part thereof, may be swept over by the steam jet by turning the apparatus through an angle less than 180°.

The turning movement of the discharge pipe 6 is limited by the play of the pins or screws 23 in the slots 24 of the control rods 13 and 19. As the reciprocative movement of the rod 19 on the rod 13 is limited, so the oscillative movement imparted by the arm 20 to the pin 15 and discharge pipe 6 is likewise limited. In this way the oscillation of the discharge pipe and its nozzle will be restricted so to confine the sweeping effect of the steam jet to area occupied by the ends of the tubes opening through the furnace wall.

The device shown in the drawings and described hereinbefore evidently only represents an embodiment of the invention which may be modified in its details without departing from the spirit or the scope of the invention. Thus, for instance, the apparatus may be disposed vertically or it may be entered obliquely through the top of the furnace instead of being inserted from the side thereof; the discharge nozzle may be differently shaped, and the manipulation of the apparatus may be effected otherwise and by other means than hereinbefore described, provided the characteristic nature of the apparatus is such, that it may, when acted upon from within the driver's cab, also during the run of the locomotive, send the steam jet against the whole of the set of tubes, or only against a part thereof, so as to force the grime out of the tubes.

Claims:

1. A locomotive having a cab at its rear end, a furnace having a side wall, and a boiler having a set of tubes extending lengthwise from the furnace, a tubular nipple extended through the wall at a point exterior of the cab with its axis in a plane extending across the axes of the tubes and a steam discharge pipe slidably and rotatably arranged within the nipple, said pipe having a nozzle, and means operable from the cab for turning the nozzle and sliding it transversely of the axes of the tubes for directing the steam into said tubes from said nozzle.

2. A locomotive having a cab, a furnace with a side wall, and boiler tubes leading from the furnace, a tubular nipple with its axis in a plane extending transversely of the axes of the tubes and extending through the side wall at a point exterior of the cab, a steam discharge pipe having a hole through its wall, said pipe being slidably and rotatably arranged within the nipple, said nipple having therein a steam chamber, a steam pipe leading to said chamber, and means extending to the cab whereby said first mentioned pipe may be moved by a person in the cab lengthwise to bring the hole in the pipe into communication with the steam chamber and the pipe oscillated as described.

3. In a locomotive provided with a cab, a furnace having a side wall and a boiler having a battery of tubes leading from the furnace, a tubular nipple in said wall at a point exterior of the cab and a steam discharge pipe rotatably arranged within the nipple and slidable therein in a plane extending transversely to the axes of the tubes, said discharge pipe having a nozzle flared to effect a spreading of the steam jet in the shape of a fan, part of the jet being directed at right angles to the axis of the discharge pipe and part at acute angles thereto, means for operating the pipe extending to the cab whereby, by small lengthwise and oscillating movement of the nozzle through said means by a person in the cab, steam may be projected into the ends of said tubes.

4. A locomotive having a cab, a furnace with a side water wall and a boiler having tubes leading from the furnace, a tubular nipple with its axis arranged transversely through the said side water wall at a point exterior of the cab and with its axis in a plane normal to the axes of said tubes, a steam discharge pipe slidably and rotatably mounted within the nipple, a nozzle on the end of the discharge pipe flared to effect a fan-like spreading of cleaning steam, and means operable from the cab for effecting the sliding and rotating of the discharge pipe.

5. A locomotive having a cab, a furnace and a boiler with tubes extending from the furnace through the boiler, said boiler having water-legs adjacent the opposite sides of the furnace, a fire bridge extending across the fire box of the furnace between the water-legs of the boiler, a tubular nipple mounted transversely of one of the water-legs at a point between the terminals of the tubes and the fire bridge, a steam discharge pipe rotatable and slidable in the nipple, a nozzle on the inner end of the discharge pipe and provided with a flared outlet to spread the steam emitted therefrom into a fan-like jet, and means controllable in the cab for effecting the sliding and rotating of the discharge pipe in the nipple to project the nozzle into the fire box and to rotate the same to sweep the jet across the terminals of the tubes extending from the furnace through the boiler.

6. In an apparatus of the character described, the combination with a locomotive boiler having side water walls, a furnace within the boiler and tubes leading from the furnace, of a tubular nipple arranged transversely through one of the said side water walls at a point exterior of the cab and with its axis in a plane normal to the axes of the tubes, a steam discharge pipe slidably and rotatably mounted within the nipple, a nozzle on the end of the discharge pipe flared to effect a fan-like spreading of exhausting steam, and means connected with the opposite end of the discharge pipe and leading into the driver's cab for sliding and rotating the discharge pipe.

7. An apparatus of the character described including in combination, a boiler, a furnace therein, boiler tubes leading from the furnace, a nipple arranged through the walls of the furnace and boiler and having its axis in a plane at right angles to the longitudinal axes of the tubes, said nipple being positioned in said walls at a point exterior of the cab, a casing in the nipple, a discharge pipe slidably and rotatably arranged through the casing and the nipple and coacting with the casing to form a valve for controlling the passage of steam into the furnace, a nozzle on the inner end of the discharge pipe, and means operable from the cab for sliding and rotating the discharge pipe.

8. An apparatus of the character described including in combination, a boiler, a furnace arranged therein, tubes leading from the furnace, a bridge in the furnace, a nipple arranged through the walls of the furnace and boiler and positioned above the bridge and having its axis at approximately right angles to the longitudinal axes of the tubes, a casing in the nipple, a discharge pipe slidably and rotatably arranged through the casing and coacting with the casing to form a valve for controlling the passage of steam into the furnace, a nozzle on the inner end of the discharge pipe, and means arranged within convenient reach of the operator or driver for manipulating the discharge pipe.

9. In a locomotive, a cab, a furnace having a side wall, a boiler having a battery of tubes leading from the furnace, a tubular nipple in said wall at a point exterior to the cab and with its axis in a plane normal to the axes of said tubes and a steam discharge pipe rotatably arranged within the nipple, said pipe having a laterally discharging nozzle to project a jet of steam principally at right angles to the axis of the discharge pipe, a rod for operating the pipe extending to the cab whereby by a movement of the rod by a person in the cab, the pipe may be rotated to project steam into the ends of said tubes.

10. A locomotive having a cab, a furnace with a side wall and a boiler having tubes leading from the furnace, a tubular nipple mounted in the side wall at a point exterior of the cab and with its axis arranged in a plane extending transversely to the axes of the tubes, and at a point in the wall slightly removed from the terminals of the tubes, a steam discharge pipe slidably mounted within the nipple, a nozzle on the end of the discharge pipe flared to effect a fan-like spreading of cleaning steam, and associated means controlled from the cab for effecting the sliding of the pipe and for the rotating of the nozzle.

11. An apparatus of the character described, including in combination, a boiler, a furnace therein, boiler tubes leading from the furnace, a nipple arranged through the walls of the furnace and boiler at a point exterior of the cab and having its axis normal to the longitudinal axes in a plane of the tubes, a casing in the nipple, a discharge pipe movable endwise through the casing and the nipple, and coacting with the casing to allow the passage of steam into the furnace when the discharge pipe is moved endwise into the furnace, a nozzle on the discharge pipe, and means controlled in the cab for rotating the nozzle to project steam into the ends of said tubes.

12. A locomotive having a cab, a furnace with a side wall, and boiler tubes leading from the furnace, a tubular nipple mounted in the side wall at a point exterior of the cab and with its axis arranged in a plane extending transversely of the axes of the tubes, a steam discharge pipe having a nozzle and also a port through its wall, said discharge pipe being rotatably arranged within the nipple, said nipple having therein a steam chamber, a steam pipe leading to said chamber, and means extending to the cab whereby said discharge pipe may be moved by a person in the cab lengthwise to bring the port in the pipe into communication with the steam chamber and the nozzle oscillated to project steam into the ends of the tubes.

13. A locomotive having a furnace and a boiler with tubes extending from the furnace through the boiler, said boiler having a water-leg adjacent to a side of the furnace, a tubular nipple mounted transversely of the water-leg with its axis in a plane normal to the axes of the tubes, a nozzle mounted in the nipple to slide and to rotate therein, a steam discharge pipe mounted in the nipple and communicating with the nozzle, and means controllable at a distant point for sliding and rotating the nozzle in the nipple to project the nozzle into the furnace to sweep the steam jet across the terminals of the tubes extending from the furnace through the boiler.

14. A locomotive having a furnace and a boiler with tubes extending from the furnace through the boiler, said boiler having water-legs adjacent the opposite sides of the furnace, a fire bridge extending across the fire box of the furnace between the water-legs of the boiler, a tubular nipple mounted transversely of one of the water-legs at a point between the fire bridge and the terminals of the tubes, a nozzle mounted in the nipple to slide and to rotate therein, a steam discharge pipe mounted in the nipple and communicating with the nozzle, and means controlled at a distant point for sliding and rotating the nozzle in the nipple to project the nozzle into the furnace to the rear of the fire bridge to sweep the steam jet across the terminals of the tubes extending from the furnace through the boiler.

In testimony whereof we affix our signatures.

JOHAN BORE.
ALBERT SKOGLUND.